United States Patent [19]

Rocchetti et al.

[11] Patent Number: 5,261,032

[45] Date of Patent: Nov. 9, 1993

[54] METHOD FOR MANIPULATION RECTILINEARLY DEFINED SEGMNTS TO FORM IMAGE SHAPES

[76] Inventors: Robert Rocchetti; Nola Donato, both of Cupertino, Calif.

[21] Appl. No.: 847,420

[22] Filed: Mar. 5, 1992

Related U.S. Application Data

[63] Continuation of Ser. No. 559,362, Jul. 30, 1990, abandoned, which is a continuation of Ser. No. 252,589, Oct. 3, 1988, abandoned.

[51] Int. Cl.⁵ .............................................. G06F 15/62
[52] U.S. Cl. .................................... 395/141; 395/162; 345/189
[58] Field of Search ............... 340/748, 750, 798, 799; 395/141, 142, 143, 162, 164, 165, 166

[56] References Cited

U.S. PATENT DOCUMENTS

| 4,620,287 | 10/1986 | Yam | 364/518 |
|---|---|---|---|
| 4,754,334 | 6/1988 | Kriz et al. | 358/244 |
| 4,785,399 | 11/1988 | Evans et al. | 364/300 |
| 4,788,538 | 11/1988 | Klein et al. | 340/747 |
| 4,841,292 | 6/1989 | Zeno | 340/736 |
| 4,858,149 | 8/1989 | Quarendan | 364/522 |
| 4,930,091 | 5/1990 | Schroeder et al. | 364/522 |
| 4,944,023 | 7/1990 | Imao et al. | 382/37 |
| 4,947,447 | 8/1990 | Niyaoka et al. | 382/56 |
| 4,992,962 | 2/1991 | Ishida et al. | 364/522 |

FOREIGN PATENT DOCUMENTS

| 0167166A2 | 1/1986 | Fed. Rep. of Germany . |
|---|---|---|
| 2089179A | 6/1982 | United Kingdom . |
| 2128459 | 4/1984 | United Kingdom . |
| 2178277 | 2/1987 | United Kingdom . |
| 2179227 | 2/1987 | United Kingdom . |
| 2186470 | 8/1987 | United Kingdom . |

*Primary Examiner*—Phu K. Nguyen
*Attorney, Agent, or Firm*—Blakely Sokoloff Taylor & Zafman

[57] ABSTRACT

A method for manipulating graphic images using a computer system in which each graphic image is broken into a series of rectangles and the individual rectangles of one graphic image are combined with the individual rectangles of another graphic image to form a shape data structure which may be stored and utilized for purposes of graphic display.

10 Claims, 6 Drawing Sheets

UNION

FIG. 5a

INTERSECTION

FIG. 5b

DIFFERENCE

LINE OVERLAP CODES

FIG. 7

| INTERSECTION OPERATION SEGMENT PROCESSING | | | |
|---|---|---|---|
| CODE | OUTPUT | SEGMENT 1 | SEGMENT 2 |
| 1 | p11, p22 | p22, p12 | NEXT SHAPE 2 SEG. |
| 2 | p11, p12 | NEXT SHAPE 1 SEG. | p12, p22 |
| 3 | p21, p22 | p22, p12 | NEXT SHAPE 2 SEG. |
| 4 | p21, p22 | NEXT SHAPE 1 SEG. | p12, p22 |
| -1 | NOTHING | UNCHANGED | NEXT SHAPE 2 SEG. |
| -2 | NOTHING | NEXT SHAPE 1 SEG. | UNCHANGED |

| DIFFERENCE OPERATION SEGMENT PROCESSING | | | |
|---|---|---|---|
| CODE | OUTPUT | SEGMENT 1 | SEGMENT 2 |
| 1 | NOTHING | p22, p12 | NEXT SHAPE 2 SEG. |
| 2 | NOTHING | NEXT SHAPE 1 SEG. | p21, p22 |
| 3 | p11, p21 | p22, p12 | NEXT SHAPE 2 SEG. |
| 4 | p11, p21 | NEXT SHAPE 1 SEG. | p12, p22 |
| -1 | NOTHING | UNCHANGED | NEXT SHAPE 2 SEG. |
| -2 | p11, p12 | NEXT SHAPE 1 SEG. | UNCHANGED |

| UNION OPERATION SEGMENT PROCESSING | | | |
|---|---|---|---|
| CODE | OUTPUT | SEGMENT 1 | SEGMENT 2 |
| 1 | p22, p22 | p22, p12 | NEXT SHAPE 2 SEG. |
| 2 | p21, p12 | NEXT SHAPE 1 SEG. | p12, p22 |
| 3 | p11, p22 | p22, p12 | NEXT SHAPE 2 SEG. |
| 4 | p11, p21 | NEXT SHAPE 1 SEG. | p12, p22 |
| -1 | p21, p22 | UNCHANGED | NEXT SHAPE 2 SEG. |
| -2 | p11, p12 | NEXT SHAPE 1 SEG. | UNCHANGED |

RECTANGLE
SEG 1 => $(Y_0, Y_2)(X_0, X_2)$ Δ

RECTANGLE
SEG 2 => $(Y_1, Y_3)(X_1, X_3)$ Δ

METHOD FOR MANIPULATION RECTILINEARLY DEFINED SEGMNTS TO FORM IMAGE SHAPES

This is a file wrapper continuation of application Ser. No. 07/559,362 filed Jul. 30, 1990. Application Ser. No. 07/559,362 now abandoned was a continuation of the original patent application Ser. No. 07/252,589, filed Oct. 3, 1988 now abandoned.

BACKGROUND OF THE INVENTION

The present invention relates to apparatus and methods for displaying graphic information. More particularly, the present invention relates to data processing apparatus and methods for generating and manipulating images and data on a display system.

HISTORY OF THE PRIOR ART

In the computing industry, it has become quite common to represent and convey information to a computer user through graphic representations. These representations may take a variety of forms such as alphanumeric characters, cartesian or other coordinate graphs, or the shapes of well-known physical objects. Historically, humans have communicated with computers through a series of discrete commands which typically comprise a combination of both text and mathematical symbolic characters. The combinations of discrete commands are usually referred to as programming languages. Examples of languages using such commands include Fortran, Algol, PL/I, Basic, and Cobal. These programming languages transform a given set of user commands into machine executable "object" code.

The ease with which a computer user becomes proficient in interacting with a computer system is related to how closely the operation of the system follows the logical patterns familiar to the computer user. If the computer user is able to enter commands in an order or form which he finds logically appropriate rather than having to transpose his desired commands into the code of a programming language, proficiency in the language is achieved at a greater rate.

One system which has been developed to reduce the learning time required for a computer user to become proficient is referred to as an "object-oriented" system. An object oriented system replaces many common coded programming commands with graphic images on a computer display. Quantitatively, it has been found that since people readily think in terms of images, a person can absorb and manipulate information presented in a visual context much faster than information represented by text. The particular type of graphic interface by which the user interacts with the machine may vary for any given application.

One common interface utilizes multiple "windows" displayed on a cathode-ray tube to represent individual computer files; in each window, combinations of text and graphics are used to convey information. For example, each window may appear as an image having a form similar to the outline of a file folder of the type used in a standard filing cabinet. Each such folder may overlap other folders with the "front folder" constituting the current work file. The user may add or delete information from the current file folder window, add new items to the file folder, refile the file folder window in another location, and, generally, operate on the file folder window as if it were an actual file folder in an office.

Thus, by using a graphic image with which the user is familiar to represent the users command, and allowing the user to operate on and manipulate the image in substantially the same way as the familiar object, the computer becomes easier for the user to operate and becomes so more rapidly.

Although graphic representations have been found to be useful in computer systems, large amounts of memory are required to generate, store, and manipulate graphics characters. To produce a graphics display on a cathode ray tube, the screen full of images or text is represented as either a one (black dot) or a zero (white dot) in a block of memory known as a "bitmap". In its simplest form, each picture element (pixel) on the screen must be represented by a memory bit. If the display screen has 1024 by 1024 pixels, then one million bits of memory are necessary to represent each screen. To accomplish this, a block of memory may be allocated in a data processing storage system with each memory bit (a 1 or 0) mapped onto a corresponding pixel on the display system. Such, a one-to-one correspondence between the bitmap and the cathode-ray tube display requires a significant amount of storage space within the computer's core memory. In addition, the generation and manipulation of an image or character requires that virtually all bits in the bitmap be updated after any modification to an image. This procedure is both repetitive and time consuming and significantly hampers the practical use of interactive graphic display operating systems.

To reduce the amount of storage necessary to provide the necessary graphic capabilities for such systems, various methods have been devised. However, all such systems include limitations such as the type of images they are capable of handling and manipulating.

SUMMARY OF THE INVENTION

The present invention provides methods and apparatus which are advantageously used in conjunction with a digital computer to provide improved graphics capability. These techniques permit the presentation and manipulation of any arbitrarily defined region in terms of "shape tables".

The method and apparatus of this invention allow both linear and curved edges of graphical representations to be defined, rendered, clipped, and combined.

According to the invention, the analytical descriptions of both images and clip regions are converted to shape data structures prior to any clipping or rendering of the images. Thereafter, a boolean operator is applied to the shape data structures to manipulate one shape against another thereby producing a new shape which depends upon the two source shape data structures. This output shape may then be rendered or used by subsequent shape operations.

According to the invention, a shape consists of a sorted list of rectangles defining an area of the screen in device coordinates. This list is defined to be sorted in ascending order on the Y axis. For each Y range, there is an associated X range also sorted in ascending order.

As will be seen from the description which follows, structures defined using the shape data structure technique may be large and varied yet utilize only a relatively few definition points. Consequently, the amount of memory necessary to store the graphic structures using the shape data structure is drastically reduced over that used by the more usual methods of graphic storage. Moreover, shape data structures may be manipulated easily by computer systems utilizing well known boolean operators.

BRIEF DESCRIPTION OF THE DRAWINGS

FIGS. 5(a-c) illustrate particular generalized boolean operations which may be accomplished in accordance with the invention.

NOTATION AND NOMENCLATURE

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence, of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to method steps for operating a computer in processing electrical or other (e.g. mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to any particular computer or other apparatus. In particular, various general purpose machines may be used with programs written in accordance with the teachings herein, or may prove more convenient to construct more specialized apparatus to perform the required method steps. The required structure for a variety of these machines will appear from the description given below.

DETAILED DESCRIPTION

General System Configuration

Figures 1, 4:
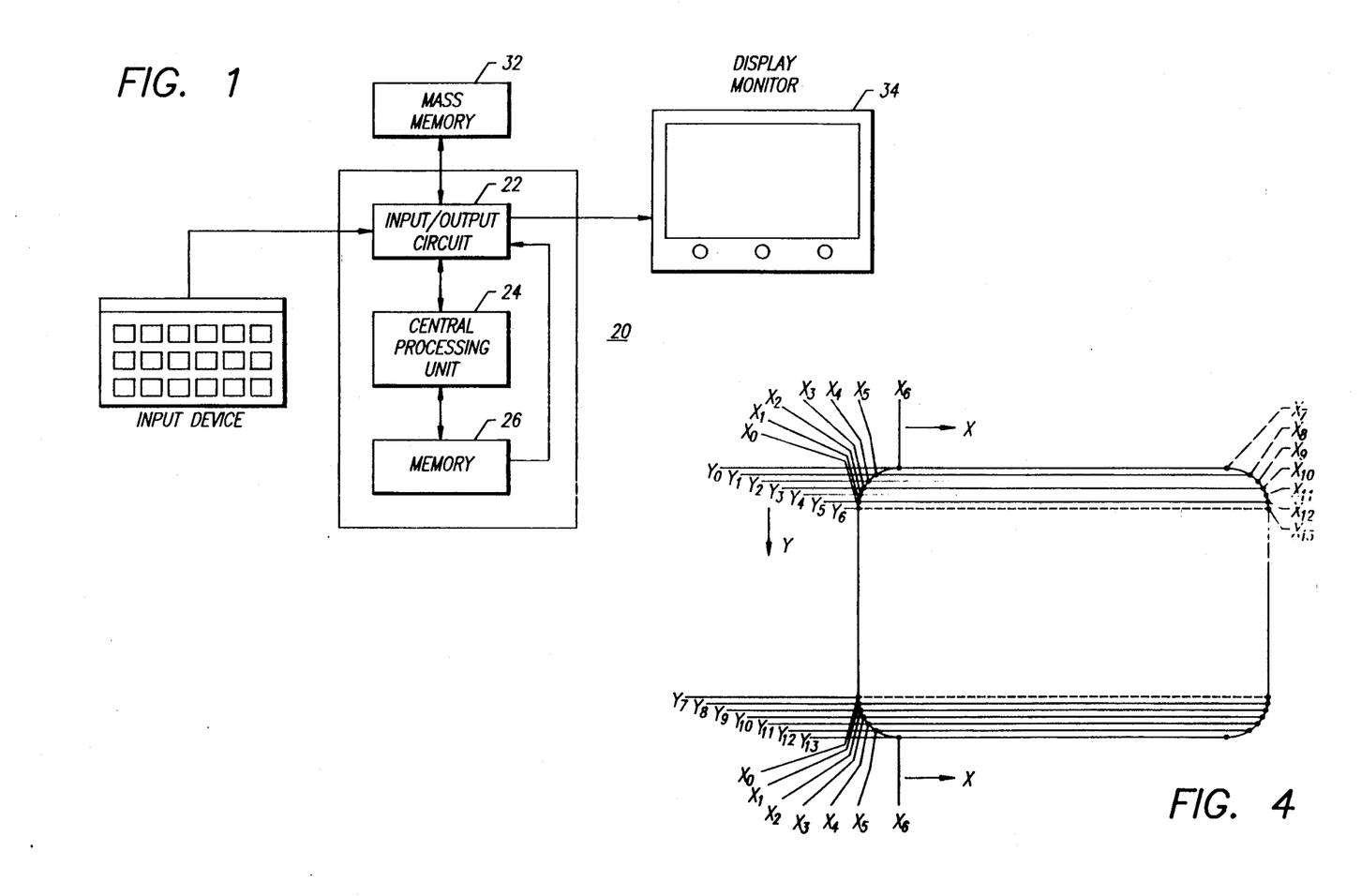
FIG. 1 illustrates in block diagram form a generalized computer system which may utilize the invention.
FIG. 4 is an illustration of a window utilized in computer graphics displays rendered by a shape diagram in accordance with the invention.

FIG. 1 shows a typical computer-based system for generating computer graphic images according to the present invention. Shown is a computer 20 which comprises an input/output circuit 22 used to communicate information in appropriately structured form to and from the other parts of computer 20 and associated equipment, a central processing unit (CPU) 24, and a memory 26. These components are those typically found in most general and special purpose computers; and the several elements contained within computer 20 are intended to be representative of this broad category of data processors. Particular examples of suitable data processors to fill the role of computer 20 include machines manufactured by Sun Microsystems, Inc., Mountain View, Calif. Other computers having like capabilities may of course be adapted in a straight forward manner to perform the several functions described below.

FIG. 1 also illustrates an input device 30 shown as a keyboard. It should be understood, however, that the input device 30 may actually be a card reader, a magnetic or paper tape reader, or some other well-known input device such as, of course, another computer. A mass memory device 32 is coupled to the input/output circuit 22 and provides additional storage capability for the computer 20. The mass memory device 32 may be used to store programs, fonts for given characters, and the like and may take the form of a magnetic or paper tape reader or some other well known device. It will be appreciated that the data retained within the mass memory device 32, may, in appropriate cases, be incorporated in standard fashion into computer 20 as part of the memory 26.

In addition, a display monitor 34 is illustrated which is used to display the images being generated by the present invention. Such a display monitor 34 may take the form of any of several well-known varieties of cathode ray tube displays or some other well known type of display.

As is well known, the memory 26 may include programs which represent a variety of sequences of instructions for execution by the central processing unit 24. For example, the control program for implementing the operations and routines described herein to monitor and control programs, disk operating systems, and the like may be stored within the memory 26.

It should, of course, be understood by those skilled in the art that the invention may be practiced by the use of a special purpose digital computer as well as the general purpose computer illustrated in FIG. 1.

The Shape Data Structure

The present invention represents any arbitrarily defined region in terms of a shape data structure. Such a structure consists of a list of rectangles defining an area of the screen of a cathode ray tube in device coordinates. The list of rectangles is sorted in ascending order based on its Y axis. For each Y range, there is an associated X range also sorted in ascending order.

Figure 2:
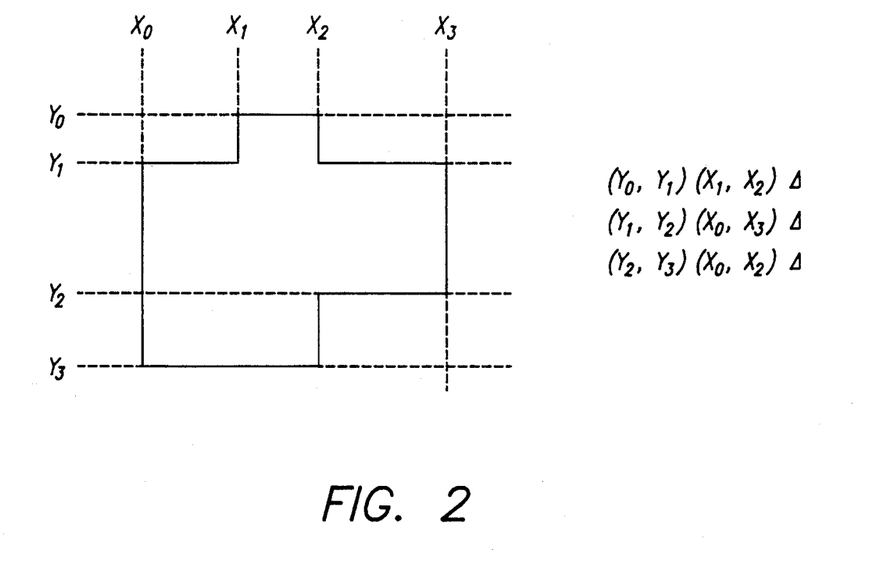
FIG. 2 is a first two dimensional illustration of a shape data structure in accordance with the invention.

Referring now to FIG. 2, a structure is illustrated which may be defined as a shape data structure. The structure shown is defined in generalized terms. Along the left side of the structure, a vertical Y axis proceeds in increasing order from upper point $Y_0$ down through points concluding with $Y_3$. Along the upper horizontal axis proceeding from left to right in increasing order appear points labelled $X_0$ through $X_3$. Each shape data structure is defined by a series of rectangles which proceed along the Y axis from the uppermost to the lowermost point of the figure. The generalized configuration shown in FIG. 2, defined by three rectangles. The rectangles used lure are arrived at by beginning at the initial the Y axis until a change occurs in the dimensions of the structure on the X axis. Thus, for the structure of FIG. 2, the first rectangle lies between the Y coordinates $Y_0$ and $Y_1$ and between the X coordinates $X_1$ and $X_2$. The coordinates of this rectangle are listed in FIG. 2 in generalized form as $(Y_0, Y_1)(X_1, X_2)$ on the first line to the right of the structure. The second rectangle begins where the first ends at the change in the X dimension; this rectangle has as its Y coordinates $Y_1$ and $Y_2$ and as its X coordinates $X_0$ and $X_3$. The coordinates of this rectangle are listed on the second line to the fight of the structure. The third rectangle is defined by the Y coordinates $Y_2$ and $Y_3$ and the X coordinates $X_0$ and $X_2$ which are listed in the third line to the fight of the structure. A shape data structure can also represent an area of a page on a printer device. This algorithm can also be applied to graphics on printers.

The entire region defined by the generalized shape data structure of FIG. 2 is the generally rectilinear figure which begins at the point $Y_0 X_1$ and continues clockwise through the points $Y_0X_2$, $Y_1X_2$, $Y_1X_3$, $Y_2X_3$, $Y_2X_2$, $Y_3X_2$, $Y_3X_0$, $Y_1X_0$, and $Y_1X_1$ back to the beginning point $Y_0X_1$.

At this point, a bounding box needs also to be defined. A bounding box is the least rectangle which encloses an entire configuration while just touching the edges of the configuration. In the configuration of FIG. 2, the bounding box is the rectangle enclosed by the rectangle joining the points $Y_0 X_0$, $Y_0X_3$, $Y_3X_3$ and $Y_3$ and $X_0$.

Figure 3:
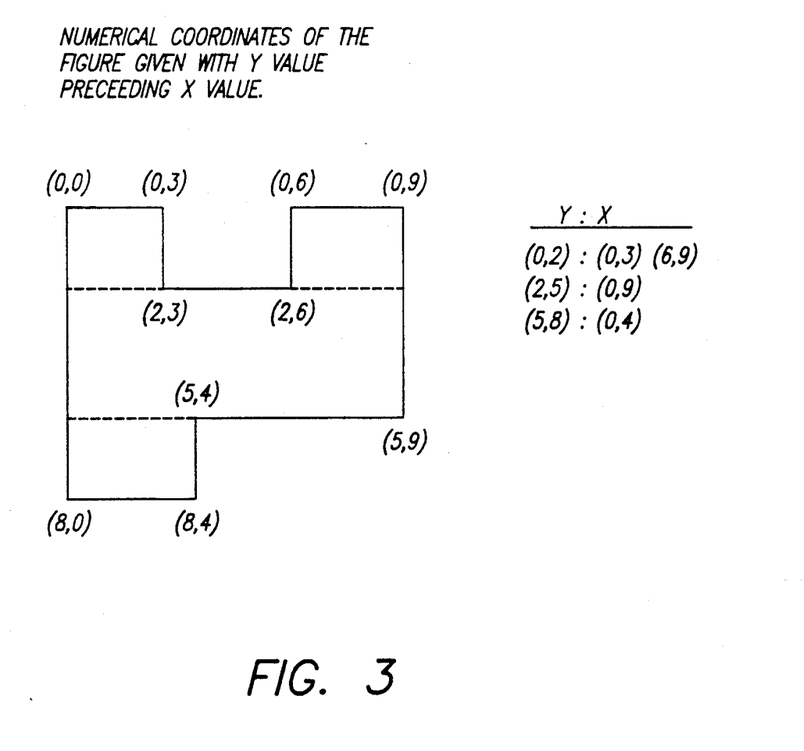
FIG. 3 is a second two dimensional shape data structure prepared in accordance with the invention.

FIG. 3 illustrates a particularized rectilinear figure described by a shape data structure having particular designated points. In the configuration of FIG. 3, the rectangular shapes describing the region begin at the $Y_0$ point and proceed downward until a first change is reached in the area defined along the X axis. This first shape has the coordinates (0,2) along the Y axis and (0,3) (6,9) along the X axis and is, consequently, defined by a pair of rectangles having the same Y dimensions but different X dimensions. These coordinates are given to the right of the structure as (0,2) and (0,3) (6,9). The second rectangular shape has the coordinates (2,5) along the Y axis and from 0 along the X is to 9 along the X axis. The coordinates for this second rectangle are given to the fight of the structure as (2,5) (0,9). The third rectangle of the shape data structure has the coordinates (5,8) along the Y axis and (0,4) along the X axis. The coordinates for this shape are shown in the third line to the right of the structure.

A shape data structure for a solid rectangle having rounded corners of the type which might be used for a window is illustrated in FIG. 4. The shape data structure for the configuration comprises the rectangles illustrated in generalized form in FIG. 4. The uppermost rectangle has Y coordinates of $Y_0$, $Y_1$ and X coordinates of $X_6$, $X_7$. It should be noted that this first rectangle would probably comprise a single scan line on the cathode ray tube. However, this rectangular shape and the other rectangles which define the curved corners are shown in FIG. 4 as more widely separated to assist in understanding the concept. The second rectangle has Y coordinates of $Y_1$, $Y_2$ and X coordinates of $X_5$, $X_8$. The rectangles proceed in order downwardly along the Y axis with each change in the X dimension until the point $Y_6$ is reached; from this point the structure does not vary in the X dimension between the points $Y_6$ and $Y_7$, and thus the next rectangle has the coordinates $Y_6$, $Y_7$ and $X_0$, $X_{13}$. Beyond the large central rectangle just defined, the shape data structure continues downwardly with a series of smaller rectangles each essentially defined by a single scan line on a cathode-ray tube. These include the rectangle with coordinates $Y_7$, $Y_8$ and $X_0$, $X_{12}$ through the rectangle with coordinates $Y_{12}$, $Y_{13}$ and $X_6$, $X_7$.

As can be seen from the structures defined to this point using the shape data structure technique, large and varied structures may be defined using only a relatively few definition points. Consequently, the amount of memory necessary to store the graphic structures is drastically reduced over that used by the more usual methods of graphic storage.

Manipulating the Shape Data Structure

Figure 5A:
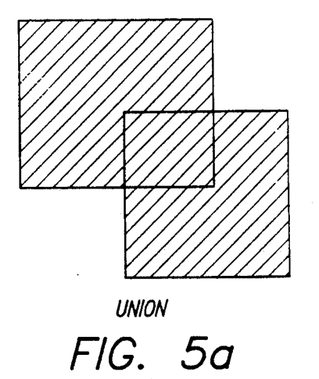
Figure 5B:
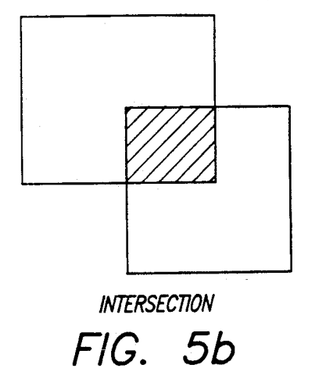
Figure 5C:
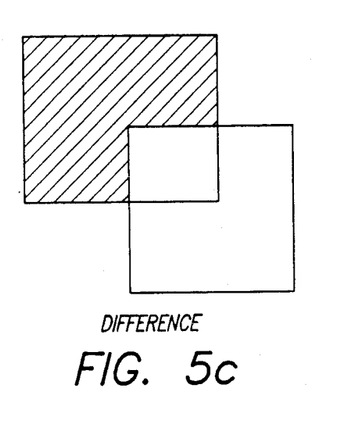

A shape data structure defined for a particular region may be manipulated to provide useful output by means of standard set operators. FIG. 5 illustrates three standard set operators which may be accomplished upon two rectangular shape data structures which overlap each other.

FIG. 5a illustrates the logical meaning of the union operator which produces an output shape describing the total region enclosed by the two input shape data structures. This output shape is produced even though the regions may or may not overlap.

FIG. 5b illustrates the logical meaning of the application of the intersection operator to the two rectangles. The intersection operator produces an output shape describing the area common to both input shapes. It is especially useful for clipping and determining areas of overlap of two regions to be displayed on a cathode ray tube.

FIG. 5c illustrates the results of utilizing the difference operator on the two rectangular regions. The difference operator produces an output shape which describes the area contained in one input shape that is not overlapped (covered) by any area of the other input shape. It is useful, among other things, in computing the visible area of a window which is overlapped by other windows.

In describing the manipulation of shape data structures, algorithms will be utilized in order to make the descriptions more succinct. In utilizing these algorithms, two input shape data structures are compared at a time; these input shape data structures are scanned and compared, rectangle by rectangle. Segments of each shape data structure are processed in pairs; these segments are the lines comprising the X and Y coordinates which define each rectangle making up each shape data structure. At any particular time, the pair of segments under consideration contain one segment from the first shape data structure and one segment from the second shape data structure. However, as the process proceeds, a segment may be replaced by a new segment derived from the original segments which have just been manipulated. When all of the segments in either of the shapes have been processed, the output shape is complete.

In order to determine the output data shape structure which should be generated under any of the operators of union, intersection, and difference, an overlap routine has been devised. This overlap routine presents all of the possible conditions under which two line segments may overlap one another and provides output in accordance with each form of overlap depending on the particular operation. These overlap possibilities are illustrated FIG. 6. In each case of the overlap routine, the first line segment is defined by points generalized as $P_{1,1}$ and $P_{1,2}$; and the second line segment is defined by points generalized as $P_{2,1}$ and $P_{2,2}$. The codes labelled with negative numbers are those in which the line segments do not, in fact, overlap.

Figure 6:
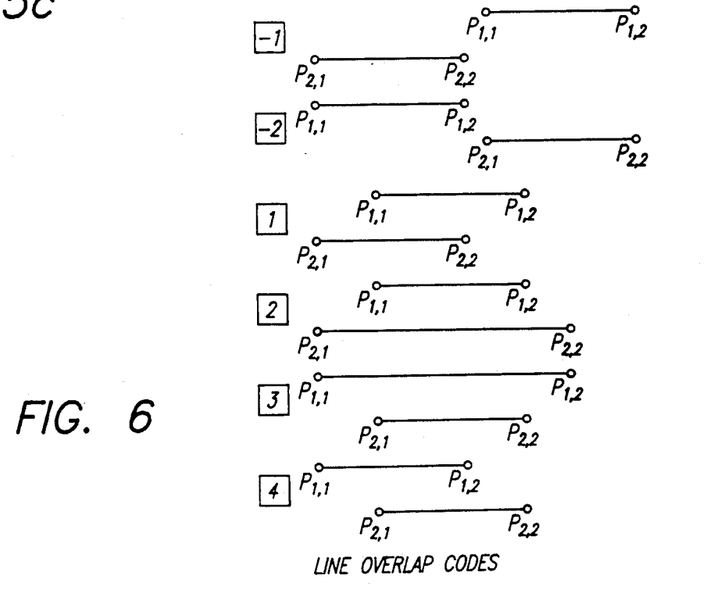
FIG. 6 is a chart illustrating different possible intersections of two line segments in a one-dimensional determination carried on in accordance with the invention.

The first example, labelled -1, illustrates a pair of line segments in which the first line segment lies entirely to the right of the second line segment without either of the two line segments overlapping one another. In the second example, labelled -2, the first line segment is to the left of and does not overlap the second line segment. In the third example, labelled 1, the two line segments overlap with the first line segment extending to the right of the second line segment, and the second line segment extending to the left of the first segment. The fourth example, labelled 2 in FIG. 6. involves two line segments in which the first is shorter than the second, and the second extends beyond the first in both directions. The fifth example, labelled 3 in FIG. 6, illustrates a first line segment which is longer than the second and overlaps the second at both ends. The sixth example, labelled 4 in FIG. 6, illustrates a first line segment which overlaps the second to the left while the second line segment overlaps the first to the right. It will be understood that these overlaps may be utilized to represent all of the possible conditions of overlap which may exist with two parallel line segments.

In utilizing the algorithms, the overlap routine shown in FIG. 6 may be used to compare two line segments (four input points) and produce an output code indicating the type of overlap. The overlap routines are used for detecting both X and Y overlap conditions.

The output codes returned by the overlap routines determine not only what is to be copied into the output shape data structure for each operation but also the next segments to be compared in the operation. In processing each of the operator algorithms, the overlap codes are tested in the following order. Overlap code 2 is first considered to see whether it is met. If not, overlap code 1 is considered, then overlap code -1, then overlap code -2, then overlap code 4, and finally overlap code 3. Where either of two codes may be utilized, in most situations, they provide both the same output and define the same segments for the next operation.

Figure 7:
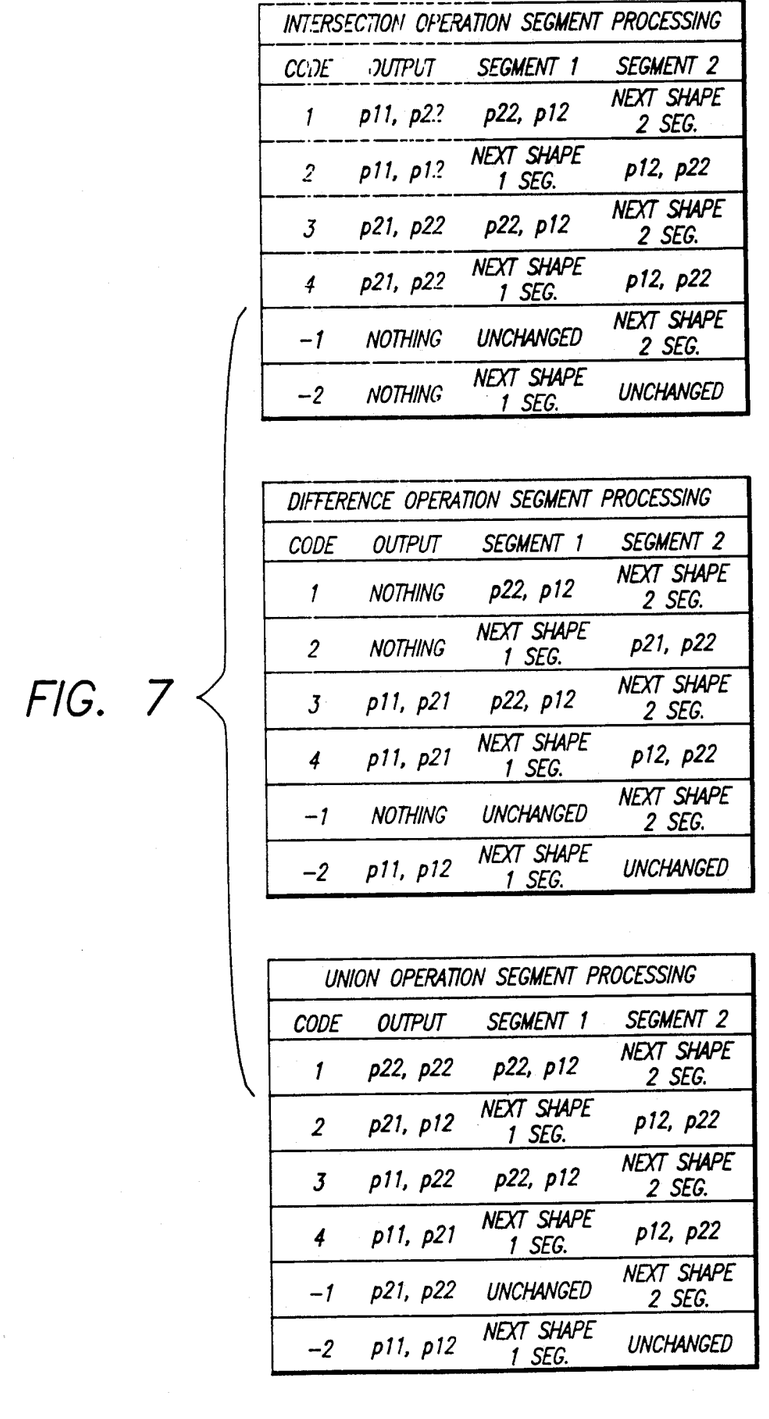
FIG. 7 is a chart listing the outputs and providing next step segments in accomplishing the boolean operations referred to in FIG. 5 in practicing the invention.

The tables of FIG. 7 are utilized with the overlap codes of FIG. 6 to indicate the output segment to be copied to the output shape data structure and the next segments to be compared for each of the intersection, difference and union operations. FIG. 7 includes three tables which define the outputs of the three operations. The upper table provides the algorithm for output for the intersection operation. The middle table provides the algorithm for determining the difference operation. The lower table provides the algorithm for determining the union operation. In reading the tables of FIG. 7, the titles "Segment 1" and "Segment 2" mean the current values for a segment from shape 1 or shape 2. Moreover, a reference such as "next shape 1 segment" means that the next segment should be fetched from shape 1 to furnish the current values for the segment.

Figure 8A:
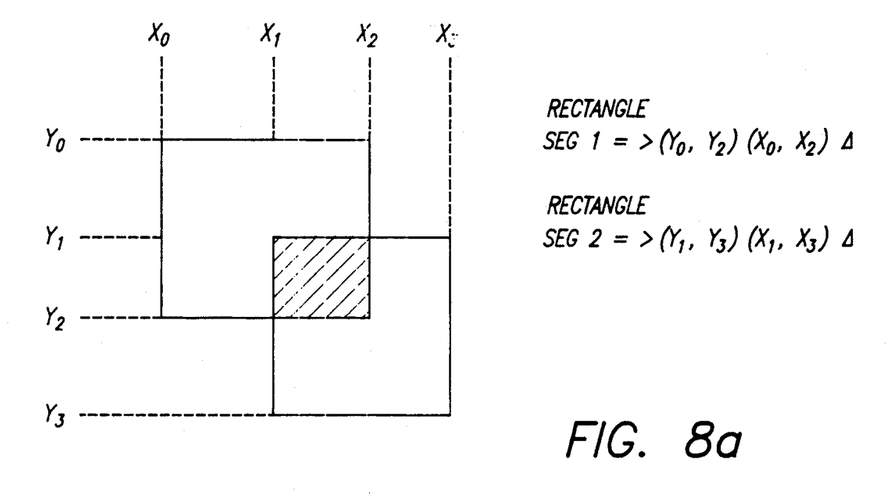
FIGS. 8a-8b illustrate a generalized operation carried out in accordance with the invention.
Figure 8B:
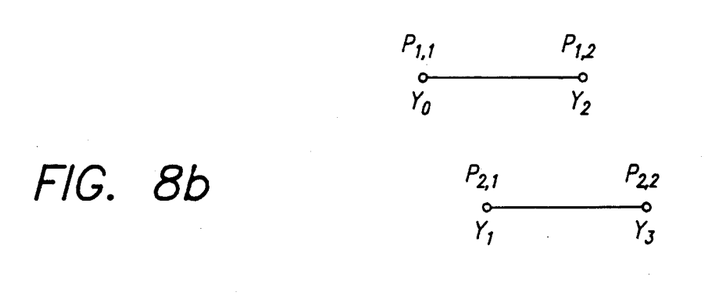

FIG. 8a illustrates in generalized form the use of the overlap codes of FIG. 6 in applying the intersection operator to two overlapping rectangles. The shape data structures for the two rectangles are illustrated by the shape equations to the right and below the rectangles. In applying the intersection operator, a first Y segment $Y_0$, $Y_2$ from the first shape data structure (the upper left rectangle) is compared to a second Y segment $Y_1$, $Y_3$ from the second shape data structure (the lower right rectangle). In FIG. 8b the first segment is shown below the data structures using both the general description $P_{1,1}$ $P_{1,2}$ and the particular description $Y_0$ and $Y_2$ while the second segment is shown using both the general description $P_{2,1}$ $P_{2,2}$ and the particular description $Y_1$ and $Y_3$. The two segments are arranged in their one dimensional positions relative to the origin of the Y axis, and a determination of their type of overlap as described in FIG. 6 is made. For example, the segments $Y_0$, $Y_2$ and $Y_1$, $Y_3$ of FIG. 8b overlap as described by code 4 of FIG. 6; that is, the point $Y_0$ is to the left of point $Y_1$ while $Y_2$ is to the left of $Y_3$ but to the fight of $Y_1$.

The intersection table of FIG. 7 shows that a code 4 overlap produces an output segment Of $P_{2,1}$ $P_{1,2}$ which is equal to $Y_1, Y_2$. This output segment is recorded, and a comparison is made of the X segments which are associated with the initial Y segments of the two shape data structures. This involves a comparison of segment $X_0$, $X_2$ from Rectangle 1 and $X_1$, $X_3$ from Rectangle 2. Arranging these in one dimensional positions relative to the origin of the X axis shows an overlap which in FIG. 6 is also defined by code 4; this produces an output segment of $P_{2,1}$ $P_{1,2}$ or $X_1$, $X_2$. There being no more X segments for the first Y segments, the next pair of Y segments is chosen. Since the last Y operation was a overlap code 4 operation, the intersection table of FIG. 7 shows that those segments are the next shape 1 segments and the segment $P_{1,2}$ $P_{2,2}$ from the last Y segment comparison. Although the latter is defined, there is no next Y segment in Rectangle 1 so the intersection operation is complete. The output shape data structure is that defined as $(Y_1Y_2) (X_1X_2)$, the expected and correct result.

Figure 9:
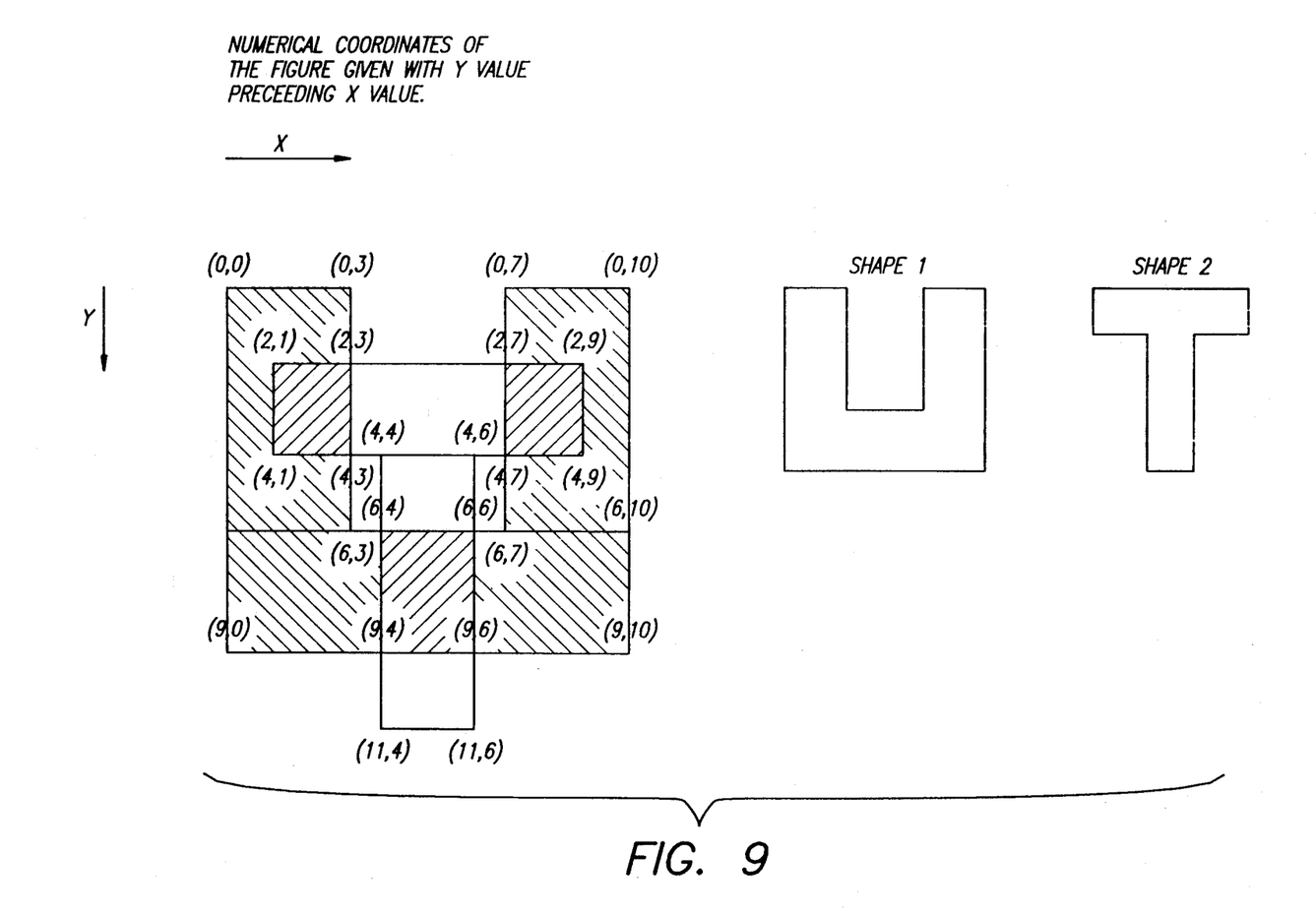
FIG. 9 is an illustration of a more particularized boolean operation carded out in accordance with the invention.

Referring now to FIG. 9, there are shown two more complex shapes which may be manipulated utilizing the shape data structures of this invention. The first shape shown in FIG. 9 is that of a capital U while the second shape is of a capital T. The two shapes have been plotted against the X and Y axes to provide numerical points which may be utilized to more readily understand the uses of the invention. In FIG. 9, the X axis commences with zero in the upper left hand corner of the U and continues to the fight positively while the Y axis commences with zero at the upper left comer and proceeds downwardly in a positive direction. The capital T is superimposed on the capital U at the position shown in FIG. 9.

INTERSECTION

The first operation to be undertaken utilizing the shape data structures is the intersection of the capital U and the capital T in the positions shown in FIG. 9. As described above, intersection produces an output shape which describes the area common to both input shapes. Such an operation is useful for clipping and determining areas of overlap in computer graphics displays.

The intersect algorithm to be used may be described as follows in pseudocode form:

Intersect Shape (shape 1, shape 2)
If either input shape is empty or bounding boxes do not overlap, return the empty shape.
Get initial Y ranges in $Y_{11}$, $Y_{12}$, $Y_{21}$, $Y_{22}$.
For next segment pair
Ycode = Overlap ($Y_{11}$, $Y_{12}$, $Y_{21}$, $Y_{22}$)
If Y ranges overlap
    Output overlapping Y range (based on Ycode)
    Get initial X ranges in $X_{11}$, $X_{12}$, $X_{21}$, $X_{22}$
    For next segment pair
        Xcode = Overlap ($X_{11}$, $X_{12}$, $X_{21}$, $X_{22}$)
        If X ranges overlap
        Output overlapping X range (based on Xcode)
        Set $X_{11}$, $X_{12}$, $X_{21}$, $X_{22}$, (based on Xcode)
        Advance shape 1 or shape 2 (based on Xcode)
        Exit if either X list exhausted.
If no overlapping X ranges output, remove previously output Y range
Set $Y_{11}$, $Y_{12}$, $Y_{21}$, $Y_{22}$ (based on Ycode)
Advance shape 1 or shape 2 (based on Ycode)
Exit loop if either input shape exhausted.

As illustrated in the above algorithm, Y segments are first compared to produce an output which is put into the output shape data structure. Then the X segments corresponding to the Y segment pair are scanned in the same manner. Those that overlap are appended to the output shape. If none of the X ranges for the current segment pair overlap, the previously determined Y output range is removed.

In this description, the U structure is treated as shape 1 and the T as shape 2. In accordance with the algorithm above, the two shapes are first intersected. Then if either shape is empty or the bounding boxes do not overlap, the algorithm returns the empty shape as the result. This initial step which takes care of the situation in which there is no intersection of the two shapes whatsoever, and the algorithm need not be completed. For definitional purposes, an empty input shape is one containing no area, while (as explained above) a bounding box is the smallest rectangle which may enclose a particular shape. For example, the bounding box for the U in FIG. 9 has X coordinates of 0,10 and Y coordinates of 0,9 while the bounding box of the T shape has X coordinates of 1,9 and Y coordinates of 2,11. In the case of the two shapes shown in FIG. 9, it is clear that neither condition is met so the next step of the algorithm is effected.

According to the next step of the algorithm, the initial Y ranges of the two shapes are selected. In generalized form, these are $Y_{11}$, $Y_{12}$ and $Y_{21}$, $Y_{22}$ while in the actual figure these are the Y segment 0,6 for the first rectangular shape of the U and the Y segment 2,4 for the first rectangular shape of the T. Having selected these initial Y ranges, the algorithm moves to a "for next loop" operation in which the output segment Y code is equal to the overlap of the two Y segments.

Using the overlap code table shown in FIG. 6 to compare the two segments shows that the overlap code to be applied is code 3; and the output from the FIG. 7 intersection table is $P_{21}$, $P_{22}$ ($Y_2/Y_{22}$) or the Y segment 2,4. This is confirmed by the algorithm which states that if the Y ranges overlap (which they do) the overlapping Y range is produced as an output based on that Y code. A graph of the two Y segments shows ranges from 0 to 6 and 2 to 4 so that the overlap from the Y segments equals 2 to 4. As the overlapping portion of the two ranges is 2,4, this is the Y segment which is produced as a first output.

The next step of the algorithm is to output the overlapping X ranges for the first Y segments. This portion of the algorithm commences with the step "Get initial X ranges in $X_{11}$, $X_{12}$ $X_{21}$, $X_{22}$." As may be seen from FIG. 9, the initial X range for shape 1 is 0,3; that is $X_{11}$ is equal to 0 and $X_{12}$ is equal to 3. The initial X range for shape 2 (the "T") is 1,9, i.e., $X_{21}$ is equal to 1 and $X_{22}$ is equal to 9.

The program then enters a "for next" loop with this segment pair and produces an X code equal to the overlap of the first pair of X segments for shape 1 and shape 2 . If those X ranges overlap, an output is produced equal to the overlapping X range based on the X code. The output produced may be determined from a visual comparison of the X segments in FIG. 9. The X ranges of the initial segments overlap in FIG. 9 are between 1 and 3. This result may also be determined by using the overlap codes shown in FIG. 6; the initial X line segments overlap in the manner shown in code 4. Looking up code 4 in the intersection table of FIG. 7, it may be seen that the output would be $P_{21}$ which is 1 and $P_{12}$ which is 3 as was previously determined by viewing the segment overlap in FIG. 9.

The next step of the algorithm is to set the X segments to new values for $X_{11}$, $X_{12}$ and $X_{21}$, $X_{22}$ based on the X code. This is done by reference to the intersection table of FIG. 7 at the last operation. The code 4 operation indicates that the next segment 1 is set to the next shape 1 segment (the X segment from 7 to 10) while segment 2 is set to the $P_{12}$, $P_{22}$ from the last X iteration (which is 3,9). Essentially, this compares that portion of the X segment of the T figure which did not overlap the U figure in the previous iteration with the remaining X segment of the first data shape structure formed from the U figure. The "for next loop" portion of the algorithm is used to determine the X code overlap for these two segments; and, if the X ranges overlap, to produce an output for the overlapping range. As may be seen by viewing FIG. 9, the overlapping portion of the X ranges for these two segments is 7,9. Referring to FIG. 6, this output may also be determined as a code 1 overlap which in the intersection table of FIG. 7 shows an output of $P_{11}$, $P_{22}$ or the same X values of 7,9.

The next step in the X iteration is to reset the X segments based on the X code. This may be determined from FIG. 7 under code 1 for the comparison operation just conducted. Segment 1 is set to $P_{22}$, $P_{12}$ or 9,10, while segment 2 is set to the next shape 2 segment. There being no further X segments in shape 2 to advance (i.e. the X list being exhausted for this first rectangle), the X portion of the algorithm is exited, and the next Y segments are set based on the Y code .

At this point, a review of the outputs already produced shows that a Y segment from 2 to 4 has been generated and associated therewith are two X segments from 1 to 3 and from 7 to 9. These intermediate outputs have generated an intermediate shape factor which includes the single line cross-hatched boxes enclosing those areas on the graph of FIG. 9.

To continue with the algorithm, in order to set the $Y_{11}$, $Y_{12}$ and $Y_{21}$, $Y_{22}$ segments based on the Y code, it is necessary to refer back to the last Y operation (i.e. the comparison of the Y segments 0,6 from the U shape and 2 4 from the T shape. As explained above, that comparison was a code 3 comparison using the overlap codes of FIG. 6. The first table of FIG. 7 shows that the next segments to be utilized in the Y comparison are a segment 1 of $P_{22}$, $P_{21}$ and a segment 2 which is the next shape 2 Y segment.

$P_{22}$, $P_{12}$ from the last comparison of the Y segments 0,6 and 2,4 is the Y segment 4,6, while the next shape 2 Y segment is the segment 4,11. Consequently, these Y segments are selected; and the algorithm is advanced to the next step where the "for next" loop for Y comparison begins. At this step, the Y code is set equal to the overlap of the two Y segments just selected or equal to 4,6. Again, this Y value may also be determined by the overlap codes shown in FIG. 6. At this point, it should be remembered that in the case in which the segments commence or start at the same X or Y point, the algorithm considers the overlap codes in a particular order as follows. The code 2 overlap is first considered to see whether it is met. If not, overlap code -1 is considered, then code 1, then code -2, then code 4, and finally code 3. In most situations where either of two codes may be utilized, they provide both the same output and define the same segments for the next operation.

In the present case, both segments commence at Y equal to 4; the segment of shape 2 is the longer, however, and extends to Y equal to 11. Consequently, code 2 (the first code to be considered) encompasses this situation and produces an output Of $P_{11}$, $P_{12}$. It should be noted that overlap code 4 which could be considered to cover these segments would produce the same output since the points $Y_{11}$ and $Y_{21}$ are identical. Moreover, it should be noted that the next segments 1 and 2 for each of codes 2 and 4 are identical. Consequently, either overlap code 2 or 4 will produce as an output a Y segment of 4,6.

The next step is to output the overlapping X ranges for those segments. Since the algorithm is still dealing with the first rectangle of the first shape data structure (the U) while the operation has moved to the second rectangle of the second shape data structure (the T), the associated X segments for the U are still 0,3 while those for the T are 4,6. Applying the next step (the "for next" iteration) produces an X code output of the overlap of these two segments. It may be determined visually from FIG. 9 that these ranges do not overlap so no X segment is provided as an output. The same result is reached by applying overlap code -2 of FIG. 6 and, referring to the first table of FIG. 7, where no output is shown for the code -2 case.

Table 7 also lists the next segments to be considered as the next shape 1 segment and the same shape 2 segment. The "next shape 1 segment" is 7,10 for the algorithm is still in the first rectangle of the U data shape structure, while the "same segment" of the T data shape is 4,6. Once again, the iteration of the "for next" code gives an output if there is an overlap. However, these two segments do not overlap so there is no output of X segments produced according to either FIG. 9 or to the overlap code table of FIG. 6 as interpreted in the intersection table of FIG. 7.

The next step in the "for next" code for the X segment pairs using code-1 shows that segment 1 is unchanged; that is, the X segment for the data shape 1 is 7,10 while the X segment for shape 2 is the next shape 2 segment. There being no next shape 2 segment, the "for next" code of the X segment operation is exited because the list is exhausted, and the algorithm returns to set the next comparison of Y segments.

In reviewing the last sets of X and Y segments last selected, it will be noted that although an output was produced when comparing the Y segments, no output was produced when comparing either of the sets of X segments. Consequently, if no X segment is produced where a Y segment is produced there is no output whatsoever, and the Y segment is discarded.

At this point, the program sets the next Y segment comparison based on the last Y code comparison. The last comparison was of Y(4,6) and Y(4,11) and was a code 2 comparison under the first table of FIG. 7. Referring to this table, it will be seen that the next shape 1 segment is Y(6,9) is to be compared to $P_{12}$, $P_{22}$ from the last comparison. $P_{12}$ in the last comparison was 6 while $P_{22}$ was 11. Consequently, the two segments to be compared are Y(6,9) and Y(6,11). For this iteration of the "for next" loop, a Y code output equal to the overlap of the two segments may be seen to be Y(6,9). This same result is reached utilizing overlap code 2 of FIG. 6 which lists an output of $P_{11}$, $P_{12}$ also equal to 6,9.

At this point the algorithm moves to set the initial X ranges for the last Y segment comparison. These are seen from FIG. 9 to be equal to X(9,10) and X(4,7). The "for next" loop is then entered, and an X code output is produced equal to the overlap of these two segments or X(4,6). The same output is shown to be the result of the overlap code 3 of FIG. 6 (an output of $P_{21}$, $P_{22}$). At this point, the next X segments are set based on the X code. Overlap code 3 shows that the next X segment of shape 1 is $P_{22}$, $P_{12}$ or X(6,10). However, the next segment of shape 2 according to X code 3 is the next shape 2 X segment and there is none. Consequently, the program exits from the X "for next" loop and returns to select the next Y segments. However, at this point, no more Y segments are available based on the Y code since, under overlap code 2 (the last Y segment comparison), there is no next shape 1 segment. Consequently, the algorithm exits and the input shape is completed.

It should be noted that the last portion of the shape data structure to be generated has a Y segment of 6,9 and an X segment of 4,6. Consequently, a total intersection output shape has been produced which is the area common to both input shapes, the total single line cross-hatched area in FIG. 9.

DIFFERENCE

FIG. 9 may also be utilized to describe the operation of difference utilizing the two shape data structures illustrated therein. As explained above, the difference operator produces an output shape which describes the area contained in one input shape but not in the other. It can be used to compute the visible areas of a window which is overlapped by other windows.

The difference algorithm processes segments in pairs in the manner of the intersection algorithm which is described above. Again, the first two Y segments are compared for each shape, and an output segment is put into the output shape. Then the corresponding X differences are computed. Parts of the first input shape which do not overlap the second are included in the output shape. Non-overlapping parts of the second shape are discarded. If the segments do not overlap, the current shape 1 segment is appended. When the end of the second shape is reached, any remaining entries from the first shape are copied into the output shape. When the first shape is exhausted, the program is exited.

The difference algorithm in pseudocode form is as follows:
If shape 1 is empty, return the empty shape.
If shape 2 is empty, return shape 1
If bounding boxes do not overlap, return shape 1
Get initial Y ranges in $Y_{11}, Y_{12}, Y_{21}, Y_{22}$.
For next segment pair
Ycode=Overlap $(Y_{11}, Y_{12}, Y_{21}, Y_{22})$
    If Y ranges overlap, output difference of Y ranges
    If Y output produced, output X ranges from shape 1
    Output overlap of Y range
    Output difference of X ranges
        Get initial X ranges in $X_{11}, X_{12}, X_{21}, X_{22}$
        For next segment pair
            Xcode=Overlap $(X_{11}, X_{12}, X_{21}, X_{22})$
            If X ranges overlap, output difference of X range (based on Xcode)
            Set $X_{11}, X_{12}, X_{21}, X_{22}$ (based on Xcode)
            Advance shape 1 or shape 2 (based on Xcode)
            Exit if either X list exhausted
            If shape 2 advanced last, OutPut $X_{11}$ $X_{12}$ and remainder of shape 1 X list.
    Set $Y_{11}, Y_{12}, Y_{21}, Y_{22}$ (based on Ycode)
    Advance shape 1 or shape 2 (based on Ycode)
    Exit if either input shape exhausted
    Output remainder of shape 1

Using this algorithm, two types of Y ranges are appended to the output shape. When the first segment of the pair being compared is to the left of its partner, the Y range which does not overlap is produced as an output. The current X list from shape 1 is also added to the output. If the segments overlap, the overlapping Y range is then added to the output shape. The difference of the current X segments from shape 1 and shape 2 follows. If no X pairs are appended by this step, the previous Y range is removed.

The difference operation for the X dimension is simpler than the Y difference operation. X segments from shape 1 output and segments from shape 2 are skipped until an overlap in X segments is encountered or the end of either X list is reached. The difference of the pair of segments is then produced as an output and scanning continues.

The following briefly describes the application of the difference operator to the two shapes of FIG. 9. Those shapes are to be treated as they were in description of the intersection operator; that is, the U is considered to be shape 1 while the T is considered to be shape 2.

The first step of the algorithm takes care of the case in which shape 1 is empty, not the case in this instance. The second step of the algorithm returns the complete shape 1 when shape 2 is empty so that there is an output of the complete shape 1 . Step 3 returns shape 1 where the bounding boxes of the two shapes do not overlap.

For the more intricate operation in which the segments overlap, the first step in the algorithm is to select the initial Y ranges. These of course are Y(0,6) from the U shape and Y(2,4) from the T shape. For the initial segment pair a Y code is determined depending on the overlap. FIG. 6 shows the overlap to be a code 3 overlap. The difference table of FIG. 7 shows that a code 3 overlap produces an output of $P_{11}$, $P_{21}$ or a Y segment of 0,2.

If a Y output has been produced in the first step, the X ranges from shape 1 are also produced as an output. These ranges are 0,3 and 7,10. Since a Y range was produced, this produces two rectangular boxes having Y dimensions from 0 to 2 and X dimensions from 0 to 3 and 7 to 10.

The next step of the algorithm is to output the overlap of the Y ranges. It may be determined from the difference operation processing table that the overlap of the Y ranges is a Y segment of 2,4. The algorithm then outputs the difference of the X ranges. The algorithm selects the initial X ranges for the two shapes. These X ranges are X(0,3) for the U shape and X(1,9) for the T shape. The "for next" loop is then entered, and an X code is provided which is determined by the overlap of the two X segments. If the X ranges overlap, then the difference of the X ranges based on this X code is provided as a output. In this case, FIG. 6 show an overlap code 4 which produces an output of $P_{11}$, $P_{21}$ or an X segment of X(1,2). The next X segments are set using code 4 to the next shape 1 segment (7,10) and to $P_{12}$, $P_{22}$ or X(3,9). A new X code equal to code 1 is determined for these segments from the overlap code of FIG. 6. This produces an output which is the difference of the X range based on the X code or, according to code 1 in the difference table of FIG. 7, nothing.

The next X segments are set based on code 1 to $P_{22}$, $P_{12}$, or X(9,10) and the next shape 2 segment. There being no next shape 2 segment, the X "for next" loop is exited, and an output is produced which is $X_{11}$, $X_{12}$ and the remainder of the shape 1 X list if no shape 2 segment remains. This being the case, the X(9,10) is provided as an output.

This produces two additional rectangles having Y dimensions of Y(2,4) and X dimensions of X(0,1) and X(9,10). The X portion of the algorithm is exited, and the next Y segments are set based on the last Y code setting. The last Y code setting was a code 3 comparison of Y(0,6) and Y(2,4). Consequently, the next segment 1 is Y(4,6) and segment 2 is Y(4,11) as is shown by the difference table of FIG. 7.

The algorithm loops back to the beginning of the "for next" loop and determines a Y code based on the overlap of these two segments. The first comparison to be made is a code 2 comparison to produce an output based on the overlap of the Y segments. The code 2 overlap in the difference table of FIG. 7 shows that no output is produced. Consequently, the next step (which is to output the X ranges from the shape 1) is omitted because there is no Y output produced at the previous step.

The algorithm moves to output the overlap of the Y ranges a segment having a value of Y(4,6), and then moves to the X difference determination portion of the algorithm. The initial X segments are selected. These are (0,3) for the U shape and (4,6) for the T shape. If these X ranges overlap, an output is produced which is the difference of these segment ranges based on the X code. The ranges in this case overlap in accordance with the -2 code to produce an output of $P_{11}$, $P_{12}$ which is X(0,3). The next X segments are set based on this code to the next shape 1 segment or X(7,10) and the unchanged shape 2 segment of X(4,6). The overlap is determined from FIG. 6 to be a -1 code overlap producing an output of nothing. The next X segments to be set by the -1 code are a segment 1 -of X(7,10) and the next shape 2 segment. There is no next shape 2 segment so the "for next" loop is exited, and X1 1, X12, the segment X(7,10) is produced as an output.

At this point two more rectangles have been formed in the output shape by segments Y(4,6) and X(0,3), X(7,10).

The next set of Y segments are selected based on the last Y comparison which was of Y(4,6) and Y(4,11), a code 2 comparison. Thus, the next Y segments are the next shape 1 Y segment which is Y(6,9) and the shape 2 Y segment Y(6,11). These two segments produce a Y code based on the overlap code 2 and an output of nothing. There being no output at this step, no X ranges are produced as an output from shape 1. The algorithm moves to output the overlap of the Y range which is Y(4,6) and to output the difference of the X ranges. In the X portion of the loop, the next X segments are chosen. These segments are X(0,10) for the U shape and X(4,6) for the T shape. The overlap code is code 3 producing an output of $P_{11}$, $P_{21}$ or X(0,6). The X shapes are advanced to the next segments which are $P_{22}$, Pl 2 or X(6,10) and the next shape 2 segment. There being no next shape 2 segment, an output is produced which is X11, X12 or X(6,10).

This produces two more rectangular boxes having Y segments of Y(6,9) and X segments of X(0,6) and X(6,10). The algorithm looks for the next Y segments and finds no next shape 1 segment. Consequently ft exits and produces as an output the remainder of shape 1. There is no remainder of shape 1; consequently, the algorithm has been completed and the figure shown in double cross hatching of FIG. 9 is produced as an output shape.

UNION

The application of the union algorithm will be treated only briefly since the operation should be apparent to those skilled in the art in view of the complete descriptions given for the intersection and difference algorithms.

The algorithm for union is:
If shape 1 is empty, return shape 2.
If shape 2 is empty, return shape 1.
Get initial Y ranges in $Y_{11}$, $Y_{12}$, $Y_{21}$, $Y_{22}$
For next segment pair
Ycode=Overlap ($Y_{11}$, $Y_{12}$, $Y_{21}$, $Y_{22}$)
If overlap in Y range
  Output the smallest valued Y range of one segment which does not overlap the other segment (cases shown in Table 1 below)
  Output X ranges of segment corresponding to Y range output above
  Output overlap of Y ranges
  Get initial X ranges in $X_{11}$, $X_{12}$, $X_{21}$, $X_{22}$
  For next segment pair
    Xcode=Overlap ($X_{11}$, $X_{12}$, $X_{21}$, $X_2$)
    Output X range (based on X code as shown in FIG. 7)
    Set $X_{11}$, $X_{12}$, $X_{21}$, $X_{22}$ (based on Xcode) .
    Advance shape 1 or shape 2 (based on Xcode)
    Exit if either X list exhausted
  Output remainder of X lists
Else
  Output the smallest valued Y range in either segment Output X ranges of segment corresponding to Y range output above
Set $Y_{11}$, $Y_{12}$, $Y_{21}$, $Y_{22}$ (based on Ycode)
Advance shape 1 or shape 2 (based on Ycode)
Exit if either input shape exhausted
Output remainder of shapes

TABLE 1

| Y Code | Minimum Non-overlapping Y Range | Shape X List Derived From |
|---|---|---|
| 2 | $P_{21}$ $P_{11}$ | shape 2 |
| -1 | $P_{21}$ $P_{22}$ | shape 2 |
| 1 | $P_{21}$ $P_{11}$ | shape 2 |
| -2 | $P_{11}$ $P_{12}$ | shape 1 |
| 4 | $P_{11}$ $P_{21}$ | shape 1 |
| 3 | $P_{11}$ $P_{21}$ | shape 1 |

The algorithm for union is similar to the intersection algorithm except that those parts of the input shapes which do not overlap are copied to the output shape rather than being discarded. When this algorithm is applied to the two shapes of FIG. 9, the resulting output shape data structure is equal to the total of the two structures shown in FIG. 9. The union sement processing in completely described to those skilled in the art by the algorithm given above, FIGS. 6 and 7, and Table 1, above. The union operator allows complex shapes to be built up from simpler shapes.

Although the invention has been described with reference to particular arrangements and systems, it will be apparent to those skilled in the art that the details of those arrangements and systems are used for illustrative purposes and should not be taken as limitations of the invention. It will be clear that the methods and apparatus of this invention have utility in any application where graphic representations on a cathode ray tube or other output device are desired. It is, thus, to be contemplated that many changes and modifications may be made by those of ordinary skill in the art without departing from the scope and spirit of the invention.

What is claimed is:
1. A method for storing and manipulating a digital graphic image using a computer display system, said digital graphic image being two dimensional and having a first axis and a second axis orthogonal to said first axis, the method comprising the steps of:
  slicing said graphic image into a number of slices, each of said slices being parallel to said first axis and having a thickness along said second axis, the number of slices being the smallest number of slices such that each slice of said graphic image consists only of one or more parallel rectangular shapes, each of said parallel rectangular shapes having a first dimension defined by a first coordinate and a second coordinate along said first axis and a common second dimension defined by a third coordinate and a fourth coordinate along said second axis, said second dimension being equal to the thickness of the slice along said second axis;
  forming a shape data structure defining said graphic image by sequentially ordering said rectangular shapes into a list, said rectangular shapes being listed in sequential order
    first by the values of the third coordinate and the fourth coordinate along said second axis of each rectangle such that the rectangular shapes having a common second dimension are grouped together, and then by the values of the first coordinate and the second coordinate along said first axis of each rectangular shape; and storing said shape data structure in a memory.

2. The method as claimed in claim 1 in which the first axis and the second axis comprise orthogonal X and Y axes, and wherein the list of rectangular shapes in the shape data structure is sequentially ordered in ascending order.

3. The method as claimed in claim 1 wherein applying Boolean operators to a plurality of the shape data structures produces at least one output shape data structure.

4. The method as claimed in claim 3 in which applying Boolean operators to a plurality of the shape data structures compares a list of rectangular shapes stored in a first shape data structure with a list of rectangular shapes stored in a second shape data structure.

5. The method as claimed in claim 3 in which the Boolean union operator is applied to shape data structures.

6. The method as claimed in claim 3 in which the Boolean difference operator is applied to shape data structures.

7. The method as claimed in claim 3 in which the Boolean intersection operator is applied to shape data structures.

8. A method for storing and manipulating graphic images comprising of a plurality of rectangular shapes using a computer display system, the method comprising the steps of:

slicing a graphic image into a number of slices, each of said slices being parallel to a first axis of a rectilinear coordinate system and having a thickness along a second axis, the number of slices being the smallest number of slices such that each slice of said graphic image consists only of one or more parallel rectangular shapes and each of said parallel rectangular shapes has a thickness along said second axis equal to the thickness of the slice;

forming a plurality of rectangular definitions representing the parallel rectangular shapes in each slice, each of said rectangular definitions being represented by a first line segment having a first and a second coordinate values along said first axis and a second line segment having a first and a second coordinate values along said second axis perpendicular to the first axis;

ordering said plurality of rectangular definitions by sequentially ordering first and said second coordinate values of said first and second line segments; and storing the first and second coordinate values of said first and second line segments representing said rectangular definitions representing each graphical image in a memory.

9. The method as claimed in claim 8, in which the first axis and second axis forming said rectilinear coordinate system comprise orthogonal X and Y axes, wherein each rectangular definition is defined by first defining Y segments along the Y axis and ordering said Y segments in ascending order, then defining X segments associated with each sorted Y segment, and then ordering said X segments in ascending order until all rectangular definitions forming said graphic images have been defined.

10. The method as claimed in claim 9 wherein said X and Y segments of said rectangular definitions representing a first graphical image are compared with said X and Y segments of said rectangular definitions representing a second graphical image.

* * * * *